United States Patent
Mizuhara

Patent Number: 6,106,570
Date of Patent: Aug. 22, 2000

[54] NETWORK COMPUTER, AND FILE TRANSFER METHOD APPLIED TO NETWORK COMPUTER

[75] Inventor: Kumiko Mizuhara, Tokyo, Japan

[73] Assignee: Kabushiki Kaisha Toshiba, Kawasaki, Japan

[21] Appl. No.: 09/156,898

[22] Filed: Sep. 18, 1998

[30] Foreign Application Priority Data

Feb. 27, 1998 [JP] Japan .................. 10-048261

[51] Int. Cl.$^7$ .................. G06F 9/445
[52] U.S. Cl. .................. 717/1
[58] Field of Search .................. 395/712; 717/1; 707/101, 200

[56] References Cited

U.S. PATENT DOCUMENTS

| | | | |
|---|---|---|---|
| 5,444,861 | 8/1995 | Adamec et al. | 395/712 |
| 5,463,772 | 10/1995 | Thompson et al. | 707/101 |
| 5,630,139 | 5/1997 | Ozaki | 395/712 |
| 5,638,498 | 6/1997 | Tyler et al. | 395/117 |
| 5,684,716 | 11/1997 | Freeman | 345/328 |
| 5,694,596 | 12/1997 | Campbell | 707/10 |
| 5,778,234 | 7/1998 | Hecht et al. | 395/712 |
| 5,806,073 | 9/1998 | Piaton | 707/200 |
| 5,930,808 | 7/1999 | Yamanaka et al. | 707/501 |

OTHER PUBLICATIONS

Canyon Release "Drag and View 2.0". May 1997. GUI Program News, vol. 8, No. 5.

Chow. Interactive Selective Decompression of Medical Images. Jan. 1997. pp. 1855–1858. IEEE.

Bookstein et al. Model Based Concordance Compression. Apr. 1992. pp. 82–91. IEEE.

Torbey et al. Selective Decompression on a Hierarchically coded Image. Sep. 1992. IEEE.

*Primary Examiner*—Tariq R. Hafiz
*Assistant Examiner*—Wei Zhen
*Attorney, Agent, or Firm*—Finnegan, Henderson, Farabow, Garrett & Dunner, L.L.P.

[57] ABSTRACT

A network computer operates upon downloading a part of programs and data stored in a server computer as resources necessary for data processing from the server. When resources on the server are downloaded to the network computer, a plurality of resources are integrated into a compressed file. A specific extension is added to the compressed file which should be decompressed and then used after being downloaded to the network computer. The network computer stores the downloaded compressed file after decompressing the compressed file if the specific extension is added to the file, and stores the downloaded compressed file without decompressing the compressed file if the specific extension is not added to the file. As a result, it is possible to shorten time to download the resources from the server, thereby capable of realizing a network computer suited for mobile uses.

10 Claims, 7 Drawing Sheets

NETWORK COMPUTER, AND FILE TRANSFER METHOD APPLIED TO NETWORK COMPUTER

BACKGROUND OF THE INVENTION

The present invention relates to a network computer which operates upon downloading programs and data from a server (server computer), and a file transfer method applied to the network computer.

This application is based on Japanese Patent Application No. 10-048261 filed on Feb. 27, 1998, the content of which is incorporated herein by reference.

In recent years, new computer architectures called "Network Computer" have been developed instead of personal computers.

The network computer is designed to be used based on connection to a network. All programs and data necessary for data processing are downloaded from a server via a network. Each network computer operating as a client computer, therefore, need not have programs and data, and can flexibly cope with, e.g., updating of an Operating System (OS) and application programs. As a result, total costs of ownership can be drastically reduced.

However, as stated above, the network computer is designed to be used based on connection to a network, and is not usually designed to be used in a mobile environment where the computer is disconnecting to the network. It is, therefore, necessary to develop a new network computer which can perform the same operations as in the online state in which the computer is connected to the network, even if the computer operates in the offline state in which the computer is not connected to the network.

BRIEF SUMMARY OF THE INVENTION

It is the first object of the present invention to provide a network computer which can shorten time for downloading resources from the server to the network computer and is thereby effectively used for mobile uses.

It is the second object of the present invention to provide a file transfer method applied to the network computer.

The first object is achieved by the following network computer. That is, the network computer of the present invention operates upon downloading a part of programs and data stored in a server computer as resources necessary for data processing from the server. The network computer comprises means for downloading a compressed file made by compressing resources stored in the server from the server, determination means for determining whether a specific extension is added to the compressed file downloaded from the server, and means for storing the compressed file after decompressing when the determination means determines that the specific extension is added to the compressed file, and storing the compressed file without decompressing when the determination means determines that the specific extension is not added to the compressed file.

The second object is achieved by the following file transfer method applied to a network computer. That is, the file transfer method of the present invention is applied to a network computer which operates upon downloading a part of programs and data stored in a server computer as resources necessary for data processing from the server. The method comprises the steps of downloading a compressed file made by compressing resources stored in the server from the server to the network computer, determining whether a specific extension is added to the compressed file downloaded from the server, and storing the compressed file after decompressing when it is determined that the specific extension is added to the compressed file and storing the compressed file without decompressing when it is determined that the specific extension is not added to the compressed file.

In this network computer, a plurality of resources on the server are compressed into a compressed file and the compressed file is downloaded to the network computer. The compressed file is then decompressed to original plural files by the network computer. It is thus possible to shorten download time.

In the network computer for mobile uses, the problem occurs that while the network computer operates without connecting to the server, many files on the server are updated. In that case, since many resources on the server must be downloaded to the network computer when the network computer connects to the server, it takes much time to download them. Since the network computer cannot perform normal operation while downloading the resources, operation is forced to be interrupted for a long time.

According to the present invention, it is possible to shorten time for performing synchronization processing between the network computer and the server and to shorten interruption time accordingly. For example, it is possible to finish synchronization processing in a short period of time within the office before the user goes outside. If the network computer is connected to the server outside the office via a network, time for synchronization processing can be shortened to thereby realize reduced communication costs. As a result, it is possible to realize a network computer efficiently used for mobile uses.

In addition, if it is necessary to decompress a compressed file and store it in a storage device such as a hard disk drive, a specific extension is added to the compressed file. The network computer determines whether the compressed filed downloaded from the server should be used as it is or used after decompressing, depending on whether or not a specific extension is added to the compressed file downloaded. Only the compressed file given the specific extension may be decompressed and stored in a storage device such as a hard disk drive.

There is a compressed file which should be used while being compressed and stored in a storage device such as a hard disk drive. For that reason, to identify the latter file with the compressed file which have been compressed to shorten download time, a specific extension is added to a compressed file which should be used after decompressing. Based on the specific extension thus added, the network computer determines whether the compressed file should be used without decompressing or should be used after decompressing, and decompresses only the compressed file to which specific extension is added.

By so doing, it is possible to shorten download time without fear of erroneously decompressing a file which should not be decompressed.

Besides, the specific extension may include information indicating a compression type of the compressed file and specific identifier information.

The compression type can be easily determined by adopting the file type including specific identifier information added to the extension of the compressed file.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described below with reference to the accompanying drawings.

An Example of the System Arrangement of the Network Computer

Figure 1:
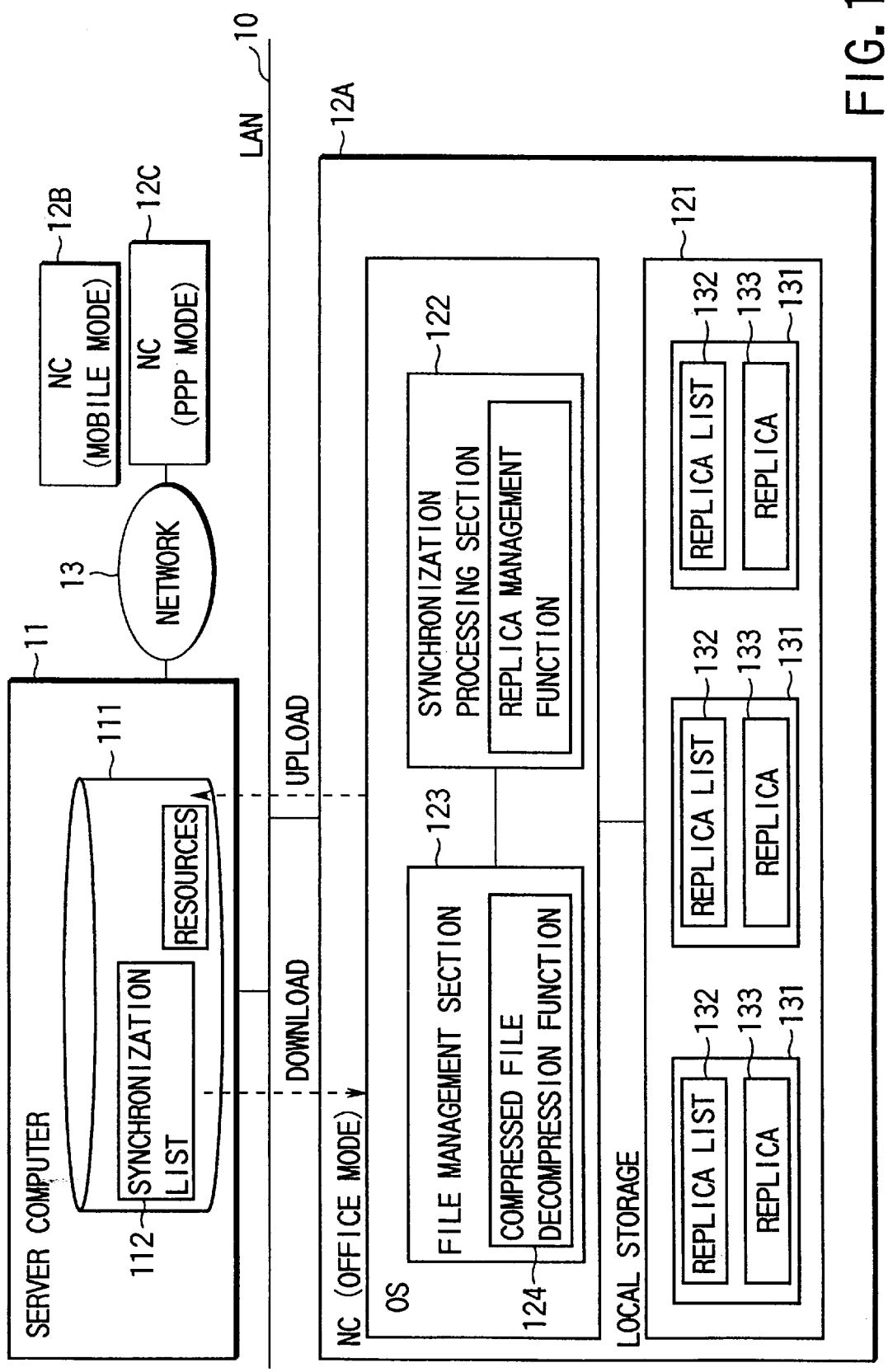
FIG. 1 is a block diagram showing an example of the system arrangement of a network computer according to an embodiment of the present invention.

FIG. 1 shows an example of the system arrangement of a network computer according to an embodiment of the present invention.

A network computer (NC) 12 (reference numeral 12 represents NCs 12A, 12B and 12C shown in FIG. 1) operates upon downloading all programs and data, such as an Operating System (OS) and application programs, necessary for data processing from a server (server computer) 11 via a network 13 such as a LAN 10 or a public switched telephone network. The network computer 12 means a computer which operates as a client in the computer system according to this embodiment.

In the office, the network computer 12A is used, connecting to the LAN 10 (office mode).

Outside the office, the network computer 12B is basically used disconnecting to the server 11 (mobile mode), but can be used remote-connecting to the server 11 via a network 13 like network computer 12c using the PPP (Point to Point Protocol), as needed (PPP mode).

The server 11 provides resources, such as programs and data, for each network computer 12 operating as a client machine. These resources are stored and managed in a hard disc drive 111 of the server 11.

The network computer 12 has a local storage device 121 to perform operations in the offline state. Replicas 133 which are copies of the resources, such as programs and data of the server 11, are stored in the local storage 121. A synchronization list 112 on the server 11 manages which resource is downloaded to the network computer 12 as a replica 133.

The synchronization list 112, here, describes files for which data synchronization processing is performed to maintain data consistency between the server 11 and the local storage 121 of the network computer 12. This synchronization list 112 manages, names of the files performing synchronization processing for each network computer 12.

When resources are downloaded to the network computer 12 to make replicas 133, a replica list 132 which is a copy of the synchronization list 112 is also downloaded and stored in the local storage 121. By using the replicas 133 stored in the local storage 121, the network computer 12 can operate without accessing the server 11. A nonvolatile storage device such as a flash memory card and a hard disk drive is used for the local storage 121.

A connected processing function and a disconnected processing function are prepared for the OS downloaded from the server 11 to the network computer 12. The connected processing function is for controlling the network computer 12 in a network operation mode in which the network computer 12 operates accessing the server 11. On the other hand, the disconnected processing function enables the network computer 12 to operate in an offline state using the local storage 121.

Furthermore, the OS has a synchronization section 122 which executes synchronization processing and a file management section 123 which manages files in the local storage 121. Specifically, the synchronization processing section 122 executes synchronization processing so that the network computer 12 can continuously perform the same operation in the both offline state and online state. Downloading and uploading of resources between the network computer 12 and the server 11 allow the resources on the server 11 and the replicas 133 in the local storage 121 to synchronize with each other, thereby ensuring data matching. The synchronization processing is executed at the time of log-in and log-out of the network computer 12.

While resources are downloaded or uploaded (i.e., synchronization-processed) between the network computer 12 and the server 11, other processing cannot be performed. That is to say, if downloading or uploading requires much time, the other processing is forced to be stopped. It is, therefore, required that synchronization processing is finished as quickly as possible. If time for communication between the network computer 12 and the server 11 is shortened, communication costs can be reduced.

Considering this, according to this embodiment, a plurality of resources on the server 11 are integrated into a compressed file before downloading them. Thereafter, the compressed file is decompressed to original plural files on the network computer 12. This is designed to shorten download time. After the compressed file is downloaded, it is decompressed to original files with the same hierarchical structures of directories and file types as original ones by the file management section 123 and the decompressed files are stored in the local storage 121. The synchronization processing using compression files as stated above is characteristic of the present invention. Detail thereof will be explained with reference to FIG. 4 below.

Next, the basic operation mode of the network computer 12 according to this embodiment will be explained.

The disconnected operation mode designed for use in the offline supports the above-mentioned mobile mode. It is designed to use the replicas 133 of server resources. A specific storage area in which replicas 133 are stored in the local storage 121 is called "Day Pack" 131. Specifically, the Day Pack 131 is located in the local storage 121 and is a specific storage area which stores programs and data necessary for users to use the network computer 12 in the mobile mode.

If replicas 133 of the programs and data of the server 11 necessary for the operation in the mobile mode are downloaded in advance to the Day Pack 131 from the server 11, the same operation performed in the network operation mode (office mode or PPP mode) can be continuously performed even after the mode shifts to the disconnected operation mode.

Also in the network operation mode, the Day Pack 131 may be used to make replicas 133 of the resources on the server 11 to prepare for the operation in the offline state. Download operation for making the replicas 133 is executed as an initial processing in the synchronization processing.

Accordingly, the following five connection modes are conceivable for the network computer 12.

Connection Modes of the Network Computer
  Office Mode
  (1) LAN & Day Pack mode
  (2) LAN mode (Day Pack is not used)
  Mobile Mode
  (3) Day Pack mode
  (4) PPP & Day Pack mode
  (5) PPP mode (Day Pack is not used)

The office modes are divided into (1) and (2) modes. The mobile modes are divided into (3) to (5) modes. Usually, however, only (3) and (4) modes are used as a mobile mode and mode (5) is not used. Therefore, four types of connection modes (1) to (4) are actually used.

Figure 2:
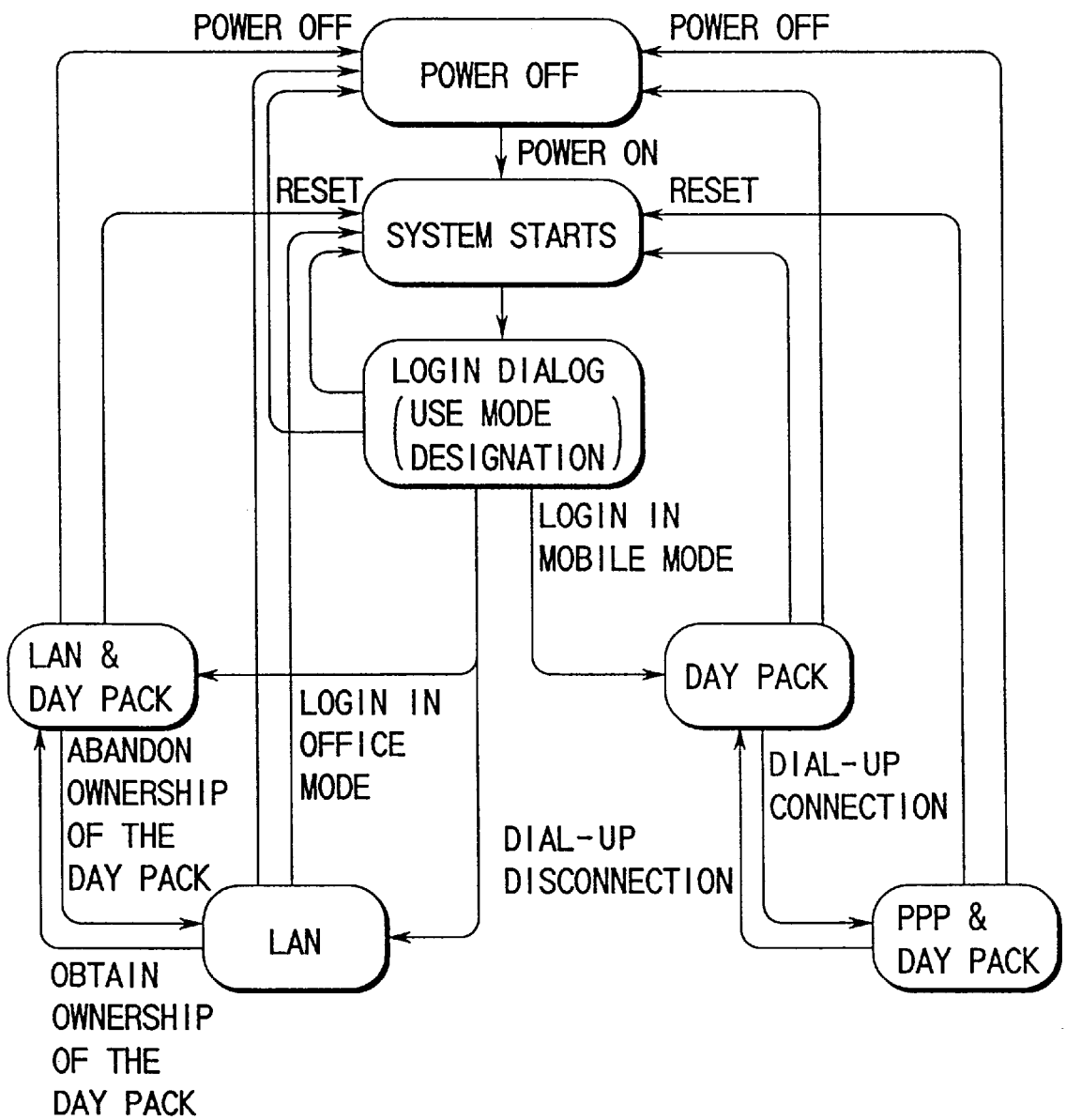
FIG. 2 is a flow chart showing the shift of the connection modes of a network computer according to this embodiment.

FIG. 2 shows the transition of these connection modes.

When the network computer 12 is powered on from a power-off state or reset in a power-on state, initialization processing by the OS starts (system starts). In login processing for causing the network computer 12 to obtain environment necessary for the operation from the server 11, a login dialog is displayed on the screen of the network computer 12, and an operation mode to be used is selected on the login dialog. The operation mode to be used is roughly divided into the "office mode" and the "mobile mode" described above.

The "office mode" is a mode designed for use in the office where the LAN can be used. When the "office mode" is selected, the LAN mode or the LAN & Day Pack mode is set as a connection mode.

The "mobile mode" is a mode designed for use outside the office where the LAN can not be used. When the "mobile mode" is selected, the Day Pack mode or the PPP & Day Pack mode is set as a connection mode.

The mechanism for selecting and shifting these modes to be used is incorporated in the OS initialization processing.

The connection modes will be described in detail below.

(a) Use of Day Pack 131 in LAN Mode

When a Day Pack 131 whose ownership is held by the user exists in the LAN mode, the LAN & Day Pack mode is automatically set. The connection mode does not shift to the LAN mode although the Day Pack 131 whose ownership is held by the user exists.

In the LAN & Day Pack mode, the user can abandon the ownership of the Day Pack 131 at any time. If the user abandons it, the connection mode shifts to the LAN mode.

In the LAN mode, if a Day Pack 131 whose ownership is not held by anyone exists, the user can acquire the ownership of the Day Pack 131. If the user acquires it, the connection mode shifts to the LAN & Day Pack mode.

(b) Use of PPP in Day Pack Mode

In the Day Pack mode, the user can start using the PPP (Point to Point Protocol) at any time. If the user starts using it, the connection mode shifts to the PPP & Day Pack mode.

To the contrary, in the PPP & Day Pack mode, the user can stop using the PPP at any time. If the user stops using it, the connection mode shifts to the Day Pack mode. When the PPP is used, the network computer 12 is connected to the server 11 via a network such as a public network, for example, a public switched telephone network or a portable telephone network.

(c) Use of PPP Mode

The PPP mode without using the Day Pack 131 is not used.

To shift the connection mode to the PPP mode, the network computer must be PPP-connected. For this purpose, the user must directly input various setting information necessary for dial-up.

On the other hand, in the PPP & Day Pack mode, various setting information necessary for dial-up can be stored in the Day Pack 131 because this mode shifts from the Day Pack mode. This information can be stored in the server 11 in advance.

Considering mobile uses, no problem arises if the use of the PPP is limited in using the Day Pack 131.

(d) Reset and Power-off

In all modes, the network computer can be reset and powered off. The "reset" means initializing the data section of the OS and executing a system initialization routine. The "power-off" means turning off the hardware power supply.

Figure 3:
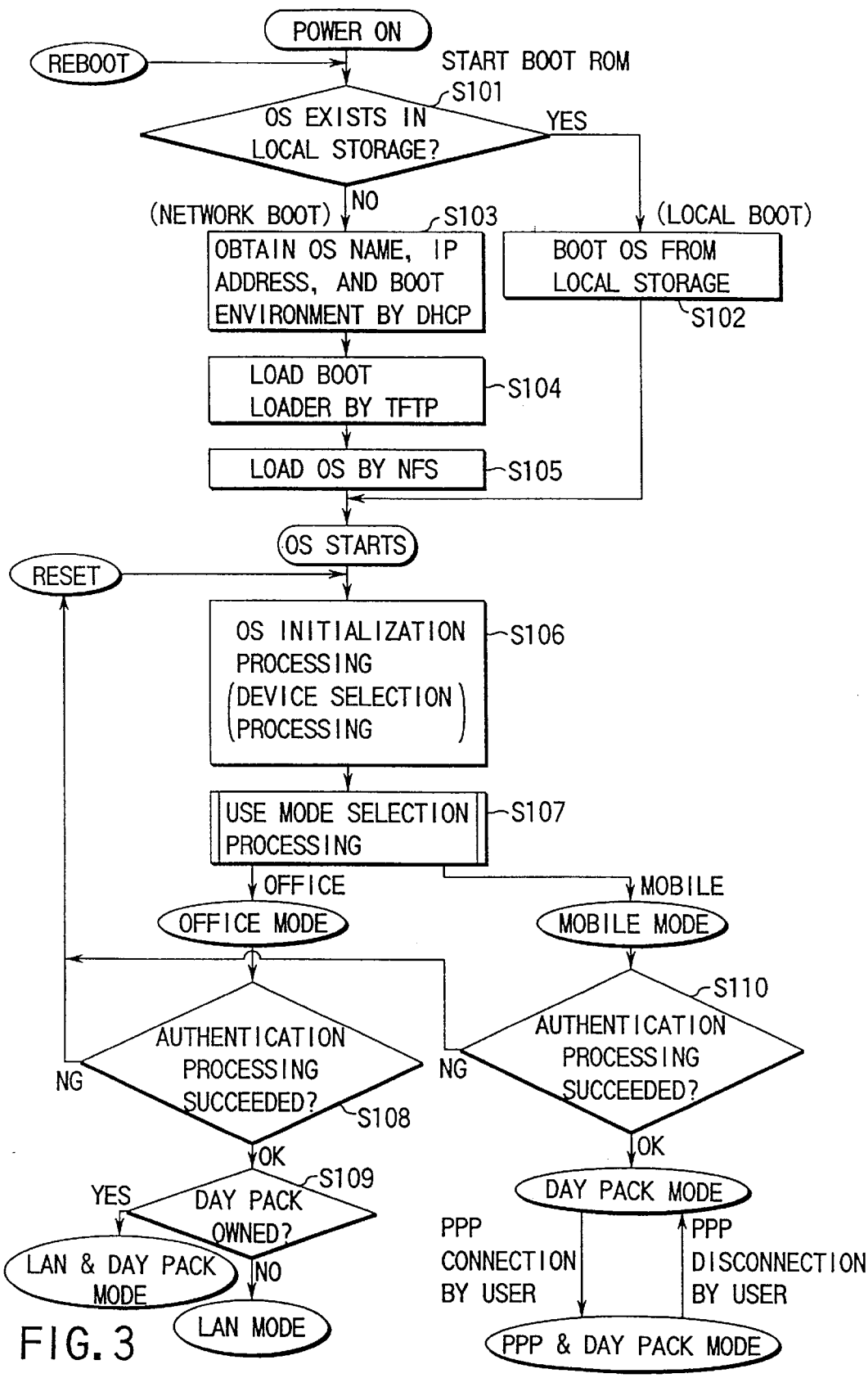
FIG. 3 is a flow chart showing the procedures of the OS activation processing applied to the network computer according to this embodiment.

The flow of processing in OS activation will be described with reference to the flow chart of FIG. 3.

When the network computer 12 is powered on or rebooted, the boot program stored in the ROM of the network computer 12 starts. In step S101, the boot program in the ROM first checks whether or not the OS is stored in the local storage 121.

If Yes in step S101, the OS is booted from the local storage 121 in step S102. If No in step S101, the boot program in the ROM automatically obtains the OS name, the IP address, and the minimum boot environment required for activating the OS by the DHCP (Dynamic Host Configuration Protocol) in step S103. In step S104, the boot program loads a boot loader from the server 11 by the TFTP (Trivial File Transfer Protocol) and transfers the control to the boot loader.

In step S105, the boot loader loads the OS from the server 11 by the NFS (Network File System) and boots the OS. In step S106, OS initialization processing starts. In this initialization processing, the network environment used by the OS, and the like are set.

After environment setting processing is finished, use mode selection processing is performed in step S107.

In the use mode selection processing, the OS checks whether or not a Day Pack 131 whose ownership has been set exists, and whether or not the LAN 10 can be used. The default value of the use mode is determined on the basis of the check results. The default value is displayed on the login dialog display of the network computer 12.

In this use mode selection processing, whether or not a Day Pack 131 whose ownership has been set by the user exists in the local storage 121 is first checked. If Yes, the "mobile mode" is set as a default value of the use mode.

Next, the DISCOVER packet of the DHCP is broadcast, and whether or not the LAN can be used is checked based on whether an OFFER packed is received or not. If the OFFER packet is received, the environment is determined to be one where the LAN can be used. The default value of the use mode is changed to the "office mode". In this manner, when the local storage 121 having the Day Pack 131 whose ownership has been set by the user exists, the "mobile mode" or "office mode" is displayed as a default value on the login dialog display in accordance with whether or not the LAN can be used. If the user explicitly changes the setting of the mode on the login dialog display, the mode changes to the mode set by the user. When the user presses the OK button on the login dialog display to confirm the current mode, processing for setting the mode starts. An indicator indicating the mode is displayed on the screen. On the other hand, if no local storage 121 exists, or no ownership has been set in the Day Pack 131 though the local storage 121 exists, then whether the LAN can be used is checked while the default mode is undetermined. When the environment is determined to be one where the LAN can be used, the "office mode" is set as a default value of the USE mode, the "office mode" is displayed as a default value on the login dialog display, and the "mobile mode" is invalidated. As described above, when no local storage 121 exists or no ownership has been set in the Day Pack 131 though the local storage exists, the "office mode" is basically selected.

When the use mode is selected in the use mode selection processing, user authentication processing is performed using a user name, a password, and the like input on the login dialog in the step S108 or S110. When the user authentication processing is successfully made, and the "office mode" is selected, then the LAN mode or the LAN & Day Pack mode is set as a connection mode on the basis of the presence/absence of the ownership of the Day Pack 131 in step S109.

When the "mobile mode" is selected, the Day Pack mode or the PPP & Day Pack mode is set in accordance with PPP connection and disconnection operations made by the user.
Synchronization Processing Synchronization processing as a characteristic feature of this embodiment will be described.

As described above, synchronization processing is designed to perform the same operation of the network computer 12 in both offline state and online state. The processing is executed by downloading/uploading resources between the network computer 12 and the server 11.

The procedures of initial processing operation for making a replica 133 on the network computer 12 will be described with reference to the flow chart of FIG. 4.

First, in step S201, the server administrator make a synchronization list 112 on the server 11 describing the resources necessary in the mobile environment. Necessary resources such as application programs and data to be used are registered in the synchronization list 112.

Thereafter, in step S202, the server administrator prepares a compressed file for high-speed downloading on the server 11. Here, among the files to be registered in the synchronization list 112, relevant plural files are integrated into a compressed file and registered in the synchronization list 112.

Archive types such as ZIP, JAR and LHZ are used for a compressed file. A specific extension is added to a compressed file. The compressed file to which the specific extension is added is referred to as an extension compression file hereinafter.

The specific extension is intended for the network computer 12 to determine whether the compressed file should be used without being decompressed or should be used after being decompressed after the compressed file is downloaded form the server 11 and stored in the local storage 121 without decompressing. The specific extension is only added to a compressed file prepared for high-speed downloading purposes and not to that used as it is without being decompressed.

Figure 5:
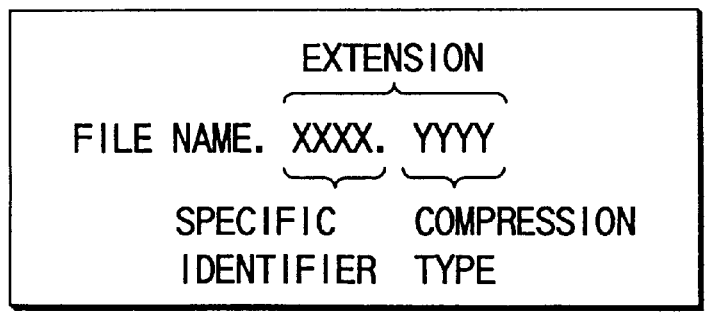
FIG. 5 is a view for explaining an extension compression file applied to the network computer in this embodiment.

The specific extension is shown in FIG. 5. A specific identifier (XXXX) common to extension compression files is put before a dot (.) and a usual extension (YYYY) indicating a compression type. The network computer 12 recognizes the specific identifier (XXXX) and the usual extension (YYYY) indicating a compression type as a unit of an extension. The file name and the specific extension are divided by a dot (.) as usual.

Description will be given hereinafter to a case a file name is abc, a specific identifier is tsbnc and an extension indicating a compression type is zip.

In case of abc.tsbnc.zip, as a specific indicator "tsbnc" is added, the OS determines that the file abc is an extension compression file which is compressed in the zip type and that it should be decompressed after being downloaded and then stored in the local storage 121.

In case of abc.zip, as no specific indicator is added, the OS determines that the file abc is a compressed file which is compressed in the zip type and that it should not be decompressed after being downloaded and should be stored as it is without being decompressed in the local storage 121.

Figure 4:
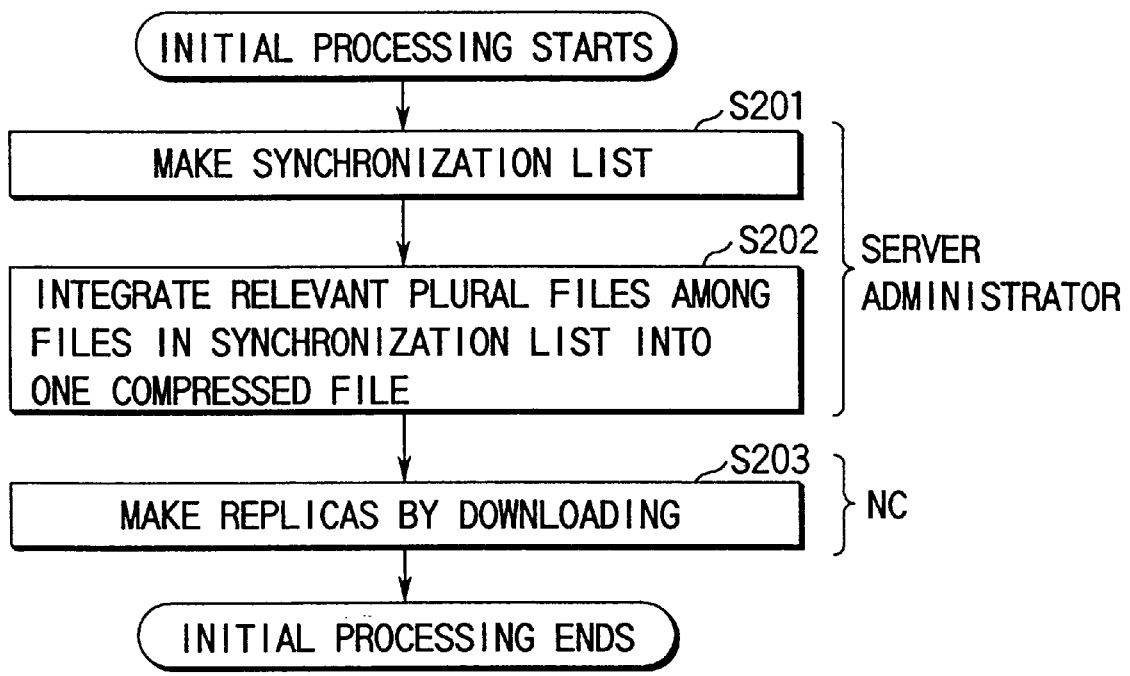
FIG. 4 is a flow chart describing the initial operation in synchronizing processing applied to the network computer according to this embodiment.

Next, in step S203 of FIG. 4, by downloading resources on the server 11, replicas 133 of the resources are made on the network computer 12.

More specifically, the network computer 12 downloads resources from the server 11 referring to the synchronization list 112, and makes replicas 133 in the local storage 121. At this time, if the downloaded file is the extension compression file as stated above, decompression processing by which hierarchical structures of directories and file types are returned to those prior to compression processing. The download processing is shown in FIG. 6.

Figure 6:
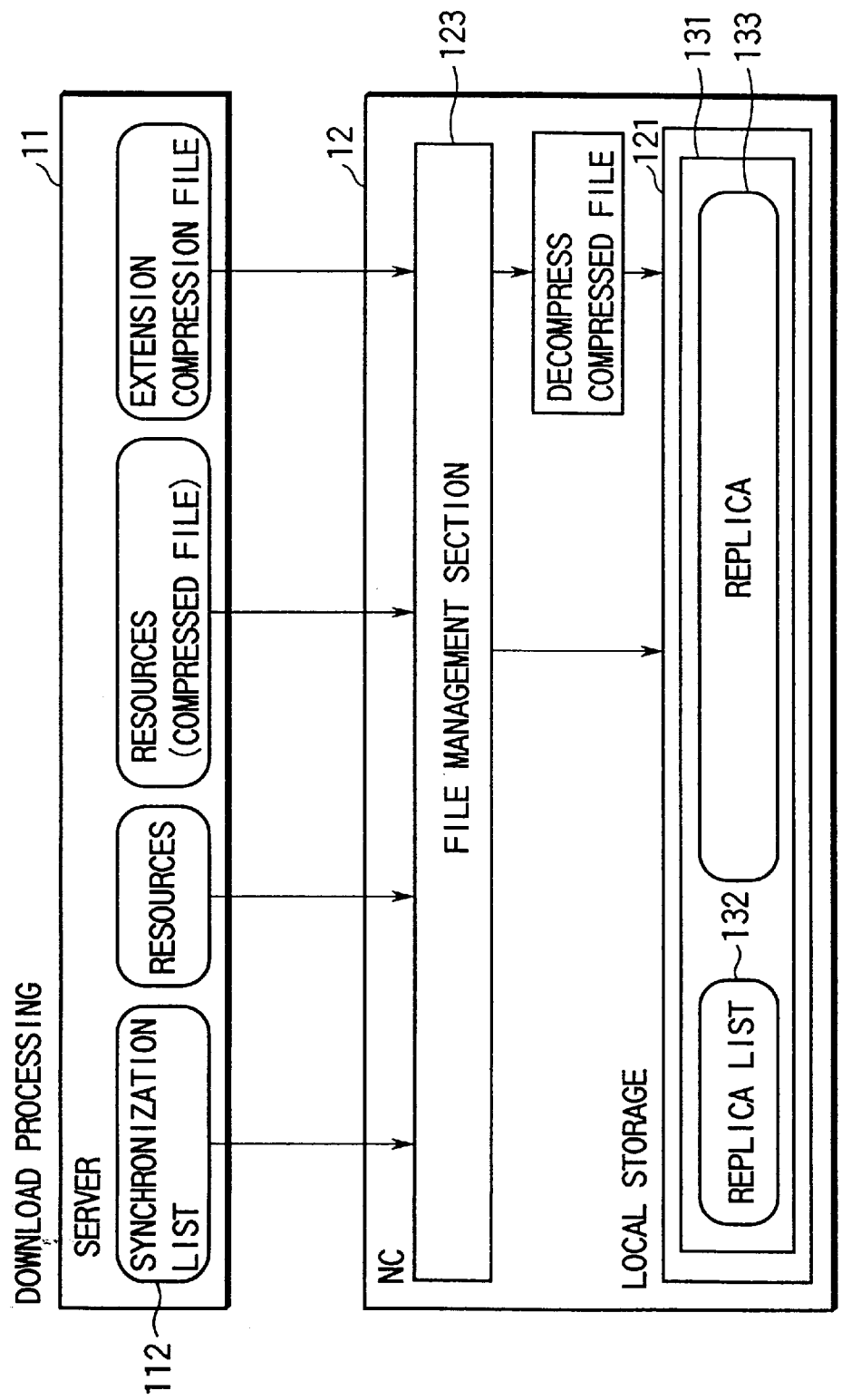
FIG. 6 is a view for explaining the operation that the network computer downloads resources on the server according to this embodiment proceeds.

As shown in FIG. 6, the resources downloaded from the server 11 is stored as replicas 133 in the local storage 121 via the file management section 123 of the network computer 12. In this case, extension compression files are stored in the local storage 121 after being decompressed to have their original hierarchical structures and file types. The other resources are stored in the local storage 121 without being decompressed even if they are compressed files. Some compressed files can be used as they are without being decompressed. Accordingly, only extension compression files are subjected to decompression processing, thereby capable of realizing high-speed downloading without losing compatibility with the files which should be used as the compressed files.

Figure 7:
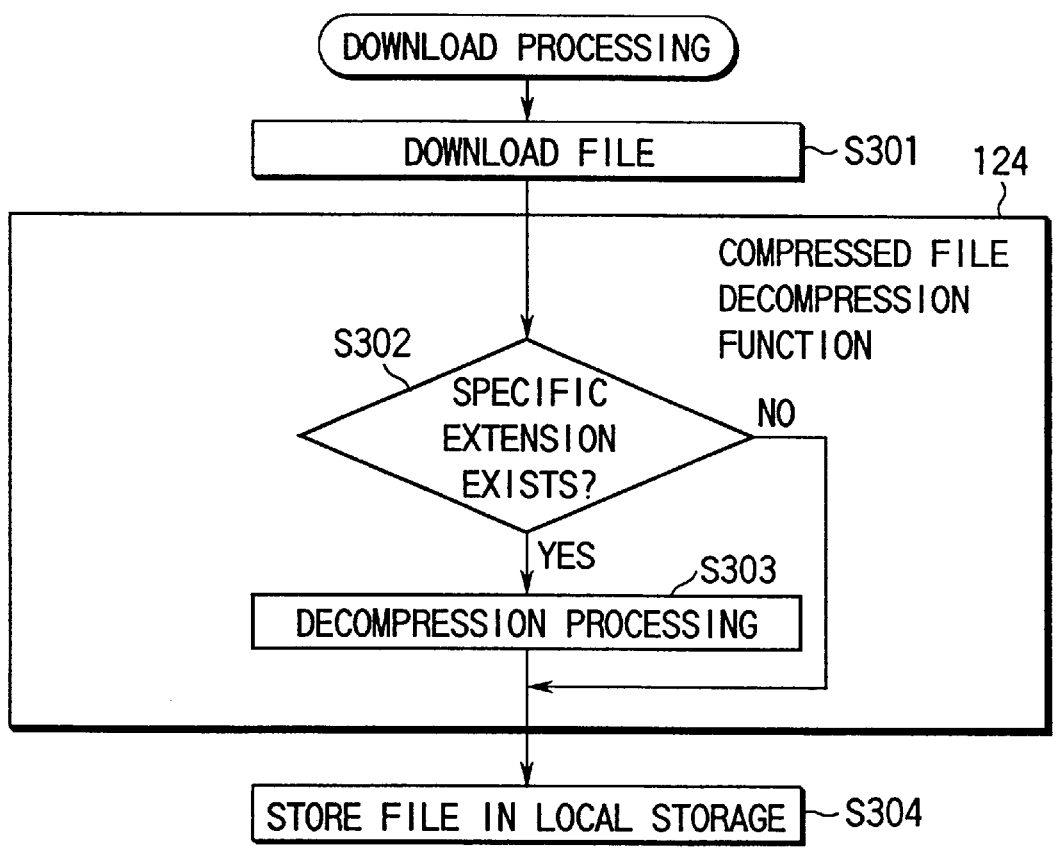
FIG. 7 is a flow chart showing the procedures of the decompression processing of the extension compression file executed by the network computer according to this embodiment.

FIG. 7 is a flow chart showing a procedure of downloading made by the network computer 12.

In step S301, the network computer 12 downloads a file from the server 11. Next, in step S302, the network computer 12 checks the extension of the file using the compressed file decompression function 124 of the file management section 123, and determines whether or not a specific extension as stated above exists.

If a specific extension is added to the compressed file, it is determined that the compressed file should be decompressed. In step S303, the decompression processing is performed. In step S304, the file is stored in the local storage 121.

Meanwhile, if a specific extension is not added, the file, even if compressed, is not subjected to decompression processing. In step S304, the file is stored as it is without being decompressed in the local storage 121.

Figure 8:
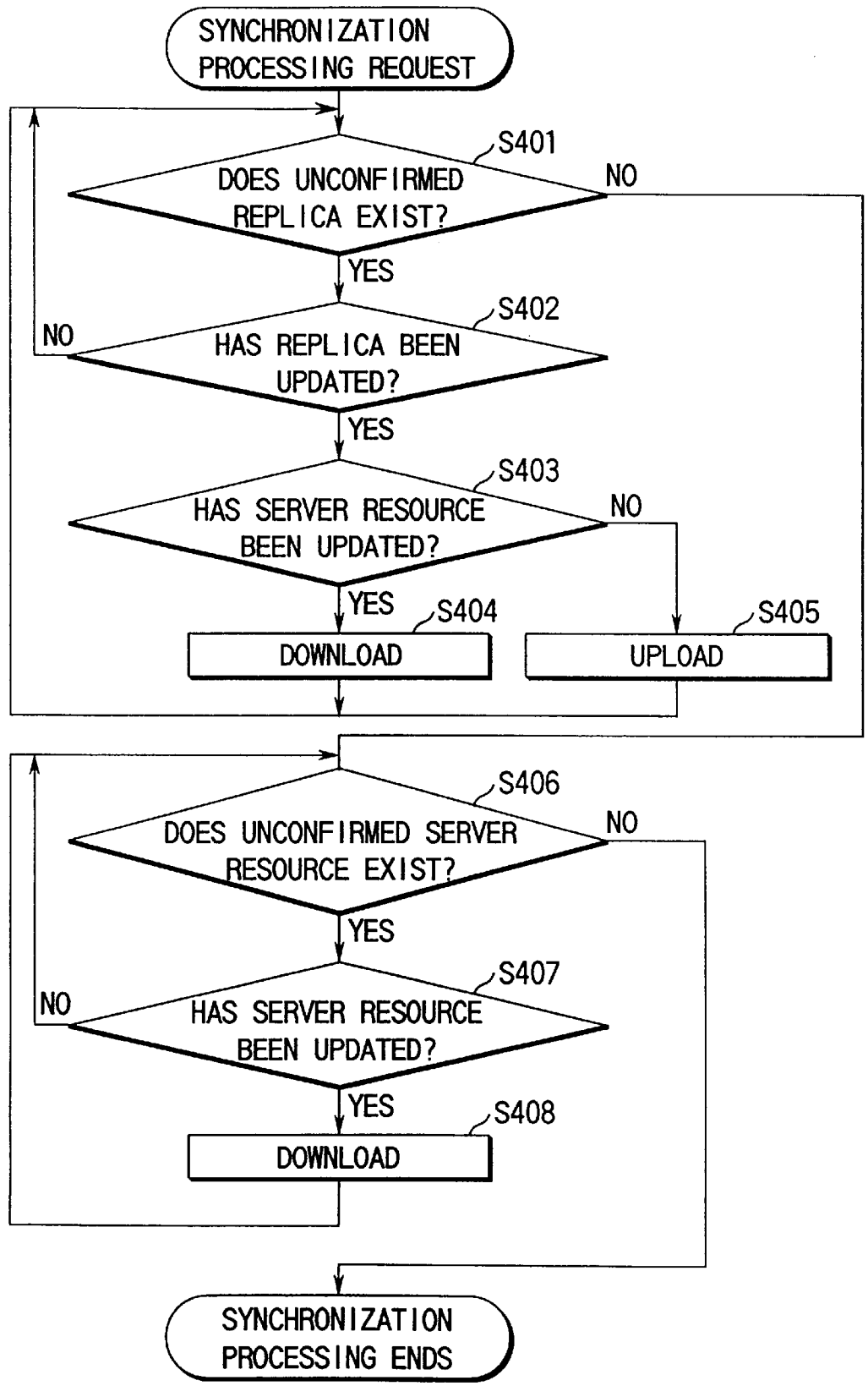
FIG. 8 is a flow chart showing the procedures of the overall synchronization processing of the network computer according to this embodiment.

Now, overall procedures for synchronization processing operation performed by the network computer 12 will be described with reference to the flow chart of FIG. 8.

First, in step S401, the network computer 12 checks whether or not unconfirmed replicas 133 still exist referring to the replica list 132. The unconfirmed replicas 133 are taken out one by one, and the following processing is performed.

In step S402, the network computer 12 checks whether the replica 133 has been updated on the network computer 12. If updated, the network computer 12 checks whether or not a corresponding resource on the server 11 has been updated in step S403, and determines that the resource on the server 11 should be downloaded to the network computer 12 or the replica 133 on the network computer 12 should be uploaded to the server 11.

If both the resource on the server 11 and the replica 133 on the network computer 12 have been updated, it is determined which should be updated, the resource on the server 11 or the replica 133 on the network computer 12 based on, for example, information indicating which should be given priority. FIG. 8 shows a case where the resource on the server 11 is given priority over the replica 133 on the network computer 12. Namely, if priority is given to the resource on the server 11, the resource is downloaded and the content of the replica 133 is updated in step S404 as shown in FIG. 8. In this case, if the downloaded file is an extension compression file, its hierarchical structure and file type are decompressed to the original ones as in the case of the initial processing.

If only the replica 133 on the network computer 12 has been updated, the replica 133 is uploaded to the server 11 and the resource on the server 11 is updated in step S405.

After all the replicas 133 listed in the replica list 132 have been processed, the synchronization list 112 on the server 11 is referred to. Resources on the server 1 listed in the synchronization list 112 are taken out one by one, and the following processing is carried out.

First, in step S406, it is checked whether or not an unconfirmed resource on the server 11 in the synchronization list 112 exists. If YES, it is checked whether or not the server resource has been updated in step S407. If YES, the server resource is downloaded to the network computer 12 and the replica 133 on the network computer 12 is updated in step S408. In this case, too, if the downloaded file is an extension compression file, decompression processing is performed to return the hierarchical structure of the directory and the file type to those prior to compression as in the case of the initial processing. In step S406, if no unconfirmed server resource remains, synchronization processing ends.

As stated above, according to this embodiment, a plurality of resources on the server 11 are integrated into a compressed file, and the compressed file is downloaded to the network computer 12 and decompressed back to original plural resources in the network computer 12. By so doing, it is possible to shorten download time and time required for data synchronization processing between the server 11 and the network computer 12. As a result, if the network computer 12 is taken outside the office, it is possible to finish the synchronization processing in the office for a short period of time before the computer is taken outside. Moreover, if the network computer 12 is connected to the server 11 outside the office using a public network, it is possible to advantageously shorten synchronization processing time to thereby reduce communication costs.

Furthermore, since it is possible to determine using a specific extension whether a compressed file should be used as it is without being decompressed or used after being decompressed, the problem of erroneously decompressing the file which does not need to be decompressed does not occur.

In addition, if a computer program for executing initialization processing procedures in the system of this embodiment are recorded in a recording medium, then the same effects as those of this embodiment can be obtained only by applying the program to the computer system of a usual client/server model.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network computer operating upon downloading a part of programs and data stored in a server computer as resources necessary for data processing, said network computer comprising:

means for downloading in a local device a compressed file made by compressing resources stored in the server computer, from the server computer, the compressed file being categorized into a first type whose file name has a first extension representing a compression type and a second type whose file name has the first extension and a second extension instructing decompression of the compressed file;

determination means for determining whether the compressed file is the first type or the second type; and means for controlling whether or not decompression of the compressed file is to be performed based on a result from said determination means.

2. The network computer according to claim 1, wherein said determination means determines whether or not the file name of the compressed file downloaded from said server computer has the second extension; and said controlling means performs decompression of the compressed file when said determination means determines that the file name of the compressed file downloaded from said server computer has the second extension.

3. The network computer according to claim 1, wherein said controlling means performs decompression of the compressed file when said determination means determines that the compression file is the second type.

4. A network computer operating upon downloading a part of programs and data stored in a server computer as resources necessary for data processing, and storing downloaded resources in a local storage device, said network computer comprising:

synchronization means for determining whether or not the resources stored in the local storage device is to be updated;

means for downloading a compressed file made by compressing resources stored in the server computer, from the server computer when the synchronization means determines that the resources stored in the local storage device is to be updated, the compressed file being categorized into a first type whose file name has a first extension representing a compression type and a second type whose file name has the first extension and a second extension instructing decompression of the compressed file;

determination means for determining whether the compressed file downloaded from the server computer is the first type or the second type; and update means for decompressing the compressed file and storing a decompressed file in said local storage device when said determination means determines that the compressed file is the second type, and storing the compressed file in said local storage device when said determination means determines that the compressed file is the first type.

5. The network computer according to claim 4, wherein said determination means determines whether or not the file name of the compressed file downloaded from said server computer has the second extension; and said update means decompresses the compressed file and stores a decompressed file in said local storage device when said determination means determines that the file name of the compressed file has the second extension, and stores the compressed file in said local storage device when said determination means determines that the file name of the compressed file has the first extension.

6. A file transfer method applied to a network computer which operates upon downloading a part of programs and data stored in a server computer as resources necessary for data processing, the method comprising the steps of:

downloading in a local device a compressed file made by compressing resources stored in the server computer, from the server computer to said network computer, the compressed file being categorized into a first type whose file name has a first extension representing a compression type and a second type whose file name has the first extension and a second extension instructing decompression of the compressed file;

determining whether the compressed file is the first type or the second type; and controlling whether or not decompression of the compressed file is to be performed based on a result of the determination of said determining step.

7. The method according to claim 6, wherein said determining step determines whether or not the file name of the compressed file downloaded from said server computer has the second extension; and said controlling step performs decompression of the compressed file when said determining step determines that the file name of the compressed file downloaded from said server computer has the second extension.

8. The method according to claim 6, wherein said controlling step performs decompression of the compressed file when said determining step determines that the compressed file is the second type.

9. A file transfer method applied to a network computer which operates upon downloading a part of programs and data stored in a server computer as resources necessary for data processing, and storing downloaded resources in a local storage device, the method comprising the steps of:

first determining whether or not the resources stored in the local storage device is to be updated;

downloading a compressed file made by compressing resources stored in the server computer, from the server computer when said first determining step determines that the resources stored in the local storage device is to be updated, the compressed file being categorized into a first type whose file name has a first extension representing a compression type and a second type whose file name has the first extension and a second extension instructing decompression of the compressed file;

second determining whether the compressed file downloaded from the server computer is the first type or the second type; and updating by decompressing the compressed file and storing a decompressed file in said local storage device when said second determining step determines that the compressed file is the second type, and by storing the compressed file in said local storage device when said second determining step determines that the compressed file is the first type.

10. The file transfer method according to claim 9, wherein said second determining step determines whether or not the file name of the compressed file downloaded from said server computer has the second extension; and said updating step decompresses the compressed file and stores a decompressed file in said local storage device when said second determining step determines that the file name of the compressed file has the second extension, and stores the compressed file in said local storage device when said second determining step determines that the file name of the compressed file has the first extension.

* * * * *